United States Patent [19]
Fiely et al.

[11] Patent Number: 5,787,228
[45] Date of Patent: Jul. 28, 1998

[54] PORTABLE VEHICLE ARTICULATED WINDSHIELD DEFROSTER WITH HEATED AIR-FLOW AND TIMER

[76] Inventors: Sharon K. Fiely; Michael J. Fiely, both of 1545 U.S. Rte. 127, Maria Stein, Ohio 45860; Darrell F. Lochtefeld, 2578 Fleetfoot Rd., St. Henry, Ohio 45883

[21] Appl. No.: 607,426

[22] Filed: Feb. 28, 1996

[51] Int. Cl.[6] ............................................. A45D 20/10
[52] U.S. Cl. ........................... 392/383; 219/203; 392/365
[58] Field of Search ............................ 392/383–385, 392/382, 365–367; 219/202, 203; 454/121, 127

[56] References Cited

U.S. PATENT DOCUMENTS

| | | | |
|---|---|---|---|
| D. 325,250 | 4/1992 | Kloster | D23/326 |
| 2,064,498 | 12/1936 | Shackford et al. | 219/203 |
| 2,165,615 | 7/1939 | Cope | 219/203 |
| 3,221,138 | 11/1965 | Hercher | 219/203 |
| 3,331,940 | 7/1967 | Reid, jr. | 219/203 |
| 4,004,126 | 1/1977 | Boaz | 219/203 |
| 4,293,759 | 10/1981 | Higgins | 454/124 |
| 4,366,368 | 12/1982 | Stephens, III | 392/385 |
| 4,637,298 | 1/1987 | Yoshikawa et al. | 98/2.08 |
| 4,757,183 | 7/1988 | Karey et al. | 392/385 |
| 4,788,413 | 11/1988 | Eng | 392/385 |
| 4,847,468 | 7/1989 | Hufstetler | 219/203 |
| 4,874,921 | 10/1989 | Gerbig, Jr. | 219/202 |
| 4,904,844 | 2/1990 | Chamberlin | 219/203 |
| 4,916,287 | 4/1990 | Soden et al. | 219/202 |
| 4,939,345 | 7/1990 | Farina et al. | 392/384 |
| 4,965,432 | 10/1990 | Harris | 219/203 |
| 5,025,130 | 6/1991 | Slone | 219/203 |
| 5,195,253 | 3/1993 | Poumey et al. | 392/385 |
| 5,296,678 | 3/1994 | Schnorf | 219/203 |
| 5,394,620 | 3/1995 | Chimera | 392/384 |
| 5,463,203 | 10/1995 | Moore | 219/202 |

FOREIGN PATENT DOCUMENTS

| | | | |
|---|---|---|---|
| 56188 | 7/1982 | European Pat. Off. | 392/384 |
| 2654692 | 5/1991 | France . | |
| 3933040 | 4/1991 | Germany . | |
| 4412654 | 10/1995 | Germany . | |
| 924118 | 4/1963 | United Kingdom | 392/385 |
| 2276955 | 10/1994 | United Kingdom . | |
| 2291699 | 1/1996 | United Kingdom . | |

*Primary Examiner*—Tu B. Hoang

[57] ABSTRACT

A window defroster for a motor vehicle consists of a plenum with a resistive electrical heater and a blower that draws in cool air and directs it over the heater coils and on to the window to be defrosted. The plenum is plugged into a stand on a timer removably mounted on the dashboard of a vehicle. The time of start and duration are programmed into the timer which is connected to the vehicle battery. The device is designed to start ten minutes before the vehicle is to be driven and stop when the driver enters the vehicle to drive away with a clear windshield.

1 Claim, 2 Drawing Sheets

PORTABLE VEHICLE ARTICULATED WINDSHIELD DEFROSTER WITH HEATED AIR-FLOW AND TIMER

BACKGROUND OF THE INVENTION

1. Field of the Invention

This invention relates generally to motor vehicles and more specifically to a front windshield defroster for motor vehicles.

2. The Problem and Related Prior Art

It is not an uncommon problem in the central and northern regions of our land that during the fall and winter months the windshields of motor vehicles, when parked for a period of time become frosted with ice particles that obscures the vision of the driver. Under some conditions the inside will also become fogged from the warm breath of the occupants striking the cold window. Although vehicles today have heaters and defrosters operating from the warm water in the engine cooling system, it takes several minutes for the engine to warm up and allow effective operation of the heater/defroster system.

There have been proposals for remotely starting vehicles and allowing them to warm up while the driver is eating breakfast for example or starting a defroster remotely by a electromagnetic signal from a unit carried by the driver. Although all of these devices are not without some merit they are impractical when one is at work and the vehicle is in a lot blocks away with several hundred other cars. Examples of prior art devices that attempt to solve the problem are shown in U.S. Patents discovered in the records of the United States Patent and Trademark Office: U.S. Pat. No. 4,004,1226 issued Jan. 18, 1977 to Boaz for a windshield heating device; U.S. Pat. No. 4,637,298 issued Jan. 20, 1987 to Yoshikawa et al. for a windshield defroster; U.S. Pat. No. 4,904,844 issued Feb. 27, 1990 to Chamberlin for a remotely operated windshield defroster; U.S. Pat. No. 325,250 issued Apr. 7, 1992 to Kloster is an example of an air defuse for a vehicle windshield defroster, and U.S. Pat. No. 5,296,678 issued Mar. 22, 1994 to Schnorf for a vehicle sun visor with an electric fan and heater assembly for clearing a vehicle windshield.

The instant invention as disclosed and claimed herein provides distinct and useful advantages not previously known to the prior art.

SUMMARY OF THE INVENTION

The invention is characterized as a portable window defroster and defogger that is dashboard mounted and is supplied with electric current from the vehicle battery. Included with the invention is a preset automatic timer which allows the defroster to turn on a preselected number of minutes before the driver is expected to arrive at the vehicle. In addition the timer allows the defroster to operate for only ten minutes before shutting down so as to not deplete the battery in the event the driver is delayed. Under normal conditions, the electric heater combined with a blower will sufficiently warm the windshield to allow the vehicle to be safely driven with unobstructed vision.

The invention is plugged into the vehicles cigar lighter which is connected to the timer box by a wire. The timer rests on the dashboard and may be secured as with velcro or double sided tape, for example. The timer is of conventional design and includes a clock and the necessary controls to perform the function intended. The defroster is mounted on top of the timer box, by plugging two electrical members into two female electrical members in the timer box. A plenum is mounted atop a support by a ball and socket joint which allows the defroster to be directed toward different areas of the windshield. The plenum contains an electrical heating unit which provides radiant heat in a conventional manner. Behind the heating unit is an electrically powered blower unit which works in concert with the heating unit and draws cold air in through a vent behind the heating element and directs it over the heater and on to the windshield.

It is therefore an object of the invention to provide a new and improved vehicle windshield defroster.

It is another object of the invention to provide a new and improved vehicle windshield defroster that is portable and may be moved from vehicle to vehicle.

It is a further object of the invention to provide a new and improved vehicle windshield defroster that is capable of timed operation;

It is still another object of the invention to provide a new and improved vehicle windshield defroster that is independent of controls and energy sources outside the vehicle.

It is still a further object of the invention to provide a new and improved vehicle windshield defroster which has all the advantages of prior known similar is devices and none of the disadvantages.

It is another object of the invention to provide a new and improved vehicle windshield defroster which may be easily and efficiently manufactured and marketed.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF A PREFERRED EMBODIMENT

Figure 1:
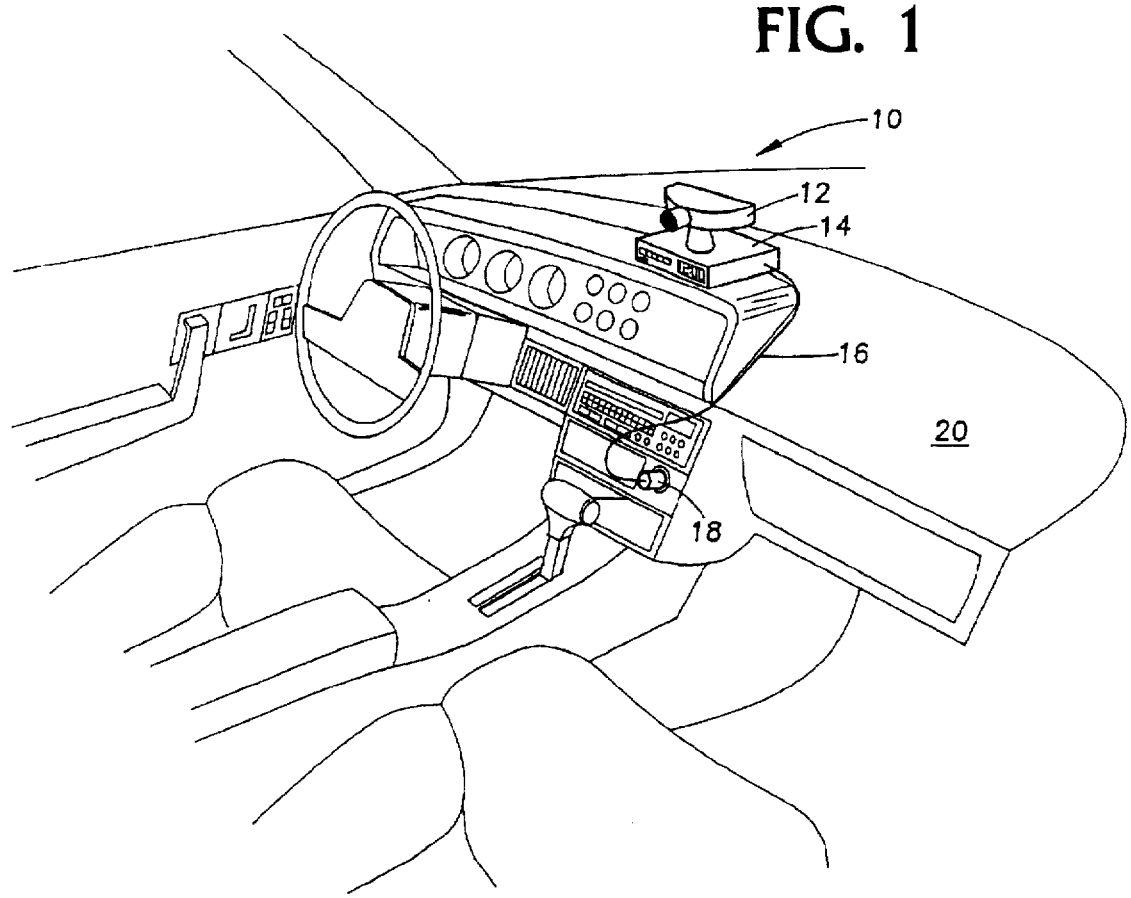
FIG. 1 is an environmental view of the invention.
Figure 2:
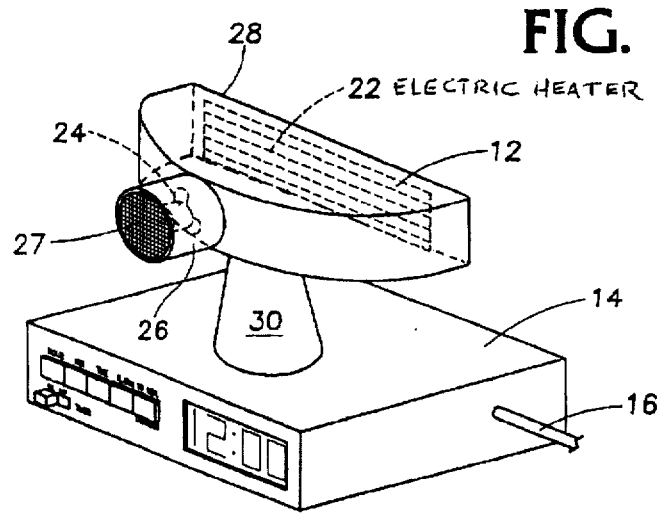
FIG. 2 is a perspective view of the invention.

Referring now to FIG. 1 the invention is shown generally at 10 and consists of a plenum 12, a timer box 14 with a wire 16 connecting the unit to the vehicle cigar lighter 18. The timer box may be attached to the vehicle dashboard by mating velcro strips or double back tape.

Within the plenum 12 is an electrical heating unit 22 which is powered by the vehicle battery through the wire 16. An electric fan and motor 24 is contained in the cylindrically shaped appendage 26 to the plenum 12. Air is drawn in through the grill 27 over end of the cylinder 26, directed over the heater unit 22 and exits through the front of the plenum 28. The plenum is mounted on a stand 30 which is connected to the timer box 14.

Figure 3:
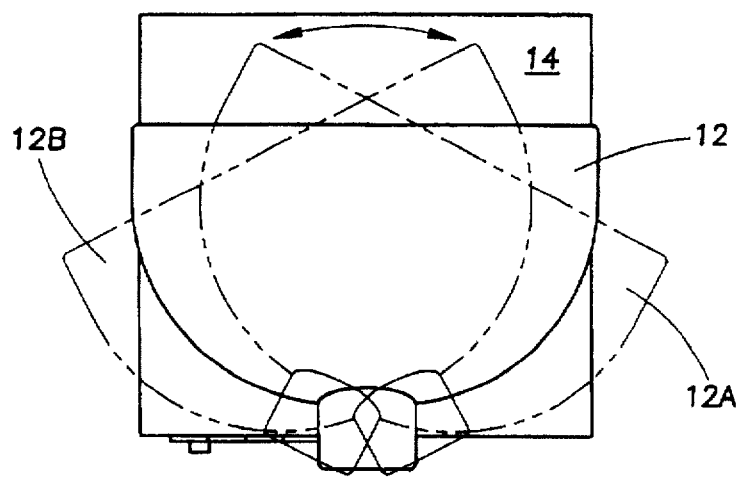
FIG. 3 is a top plan view of the invention.
Figure 4:
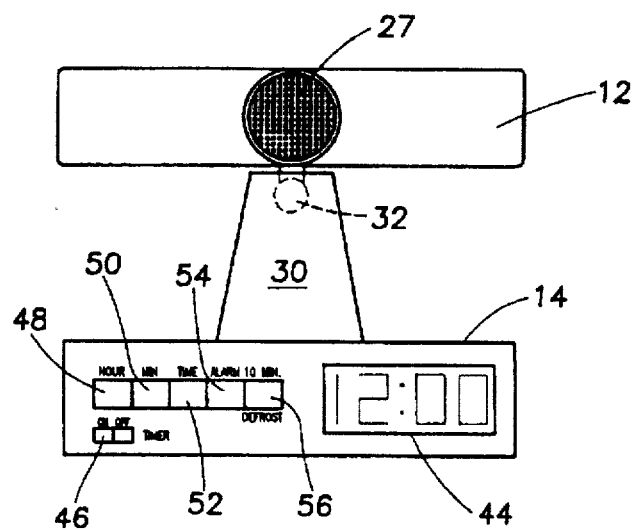
FIG. 4 is an end elevation view of the invention.
Figure 5:
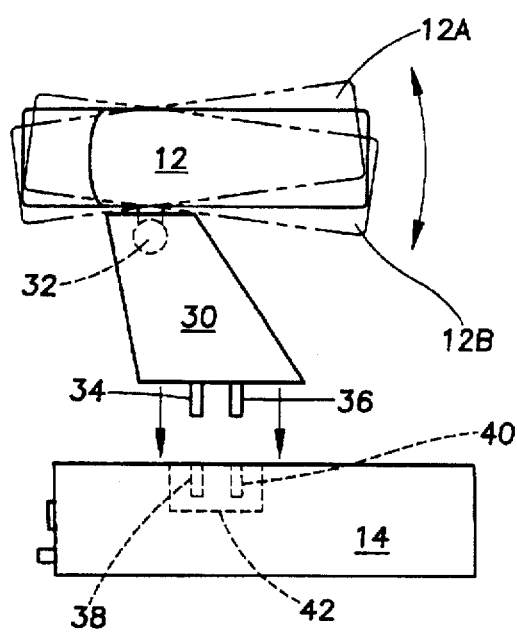
FIG. 5 is a side elevation view of the invention.

Concerning FIGS. 3,4, and 5 the plenum 12 is mounted on the stand by a ball and socket joint 32 which allows the plenum universal movement as seen in FIGS. 3 and 5 at 12,12A and 12B. The stand 30 is connected to the timer box 14 by two electrical connectors 34,36 which engage cooperating female members 38,40 in plug 42.

Timing control is of a conventional design and includes a digital time display 44, and control switches for activating the timer 46, setting the hour, minute and time, 48,50,52. Controls for activating an alarm and for the ten minute defrost time are shown at 54 and 56.

The invention is easy to operate, simply plug in the wire 16, set the time of day and the time for the defroster is to turn on and the on switch. The timer, already preprogrammed for ten minutes of operation will turn on at the set time and operate for ten minutes and turn off. If all goes according to schedule the driver should arrive at the vehicle as the defroster is turning off.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A portable vehicle windshield defroster with articulated plenum comprising:

(a) a timing box including:
      electrical circuit timing means,
      means for connecting the electrical circuit timing means to a source of electrical power,
      means connected to the electrical circuit timing means for receiving electrical output power,
      a first switch means for controlling the input power to the electrical circuit timing means,
      a second switch means for programming the activation time of the electrical timing circuit means,
      a third switch means for activating a preprogrammed period of operation,
      a time display means operatively associated with the electrical circuit timing means, and
      a female electrical plug;

(b) a plenum, having at least top and bottom walls, and an arcuate side wall connected at each end by a linear side wall forming an enclosure including:
      an electrical resistance heater mounted within the plenum, proximate the linear sidewall,
      a cylindrically shaped appendage connected through the arcuate plenum side wall,
      an electrically powered fan and motor mounted within the appendage for causing air to flow over the electrical resistance heater and through the linear plenum side wall, and
      a ball shaped mounting means connected to the bottom wall, adapted to be operatively associated with a complementary socket means in a supporting stand; and (c) a plenum support stand for supporting and connecting the plenum to the timing box including:
      a body forming a support stand having a longitudinal axis and a transverse axis where the longitudinal axis is greater than the transverse axis and defined ends,
      a socket at one end adapted to receive the ball shaped mounting means of the plenum and further adapted to allow the plenum to articulate about a horizontal axis and a vertical axis, and
      a male electrical plug means at the opposed end adapted to removeably engage and connect the supporting stand to the timing box female electrical plug.

* * * * *